United States Patent
Fox et al.

(10) Patent No.: US 8,820,117 B2
(45) Date of Patent: Sep. 2, 2014

(54) ATTACHABLE ORNAMENT WITH FUNCTIONAL FEATURES

(76) Inventors: Sue-Ellen Fox, Fullerton, CA (US); Richard Marc Ludwin, Hopewell Junction, NY (US)

( * ) Notice: Subject to any disclaimer, the term of this patent is extended or adjusted under 35 U.S.C. 154(b) by 230 days.

(21) Appl. No.: 13/361,917

(22) Filed: Jan. 30, 2012

(65) Prior Publication Data

US 2012/0196056 A1 Aug. 2, 2012

Related U.S. Application Data

(60) Provisional application No. 61/438,714, filed on Feb. 2, 2011.

(51) Int. Cl.
| | | |
|---|---|---|
| *A44C 7/00* | (2006.01) | |
| *A44C 17/00* | (2006.01) | |
| *A44C 25/00* | (2006.01) | |
| *A01K 27/00* | (2006.01) | |
| *A01K 13/00* | (2006.01) | |
| *C09J 7/02* | (2006.01) | |
| *A61D 9/00* | (2006.01) | |
| *A61D 7/00* | (2006.01) | |

(52) U.S. Cl.
CPC .............. *C09J 7/0296* (2013.01); *A01K 27/00* (2013.01); *A01K 13/003* (2013.01); *A01K 27/006* (2013.01); *A61D 7/00* (2013.01); *A61D 9/00* (2013.01)
USPC ....... 63/12; 63/14.1; 63/14.9; 63/40; 428/343

(58) Field of Classification Search
USPC ............. 428/40.1, 343; 63/12, 13, 14.1, 14.9, 63/32, 30
See application file for complete search history.

(56) References Cited

U.S. PATENT DOCUMENTS

| | | | | |
|---|---|---|---|---|
| 1,140,975 A | * | 5/1915 | Frankel | 2/1 |
| 1,300,592 A | * | 4/1919 | Essig | 2/1 |
| 2,364,872 A | * | 12/1944 | Rich | 63/14.1 |
| 2,879,567 A | * | 3/1959 | O'Connell | 24/5 |
| 3,630,810 A | * | 12/1971 | Mauro | 428/5 |
| 3,831,398 A | * | 8/1974 | Davis, Sr. | 63/14.9 |
| 4,024,879 A | | 5/1977 | Stryker | |
| 4,220,016 A | * | 9/1980 | Frenger | 63/14.9 |
| 4,425,687 A | * | 1/1984 | Sauer | 24/664 |
| 4,465,232 A | * | 8/1984 | Field | 239/36 |
| 4,858,631 A | * | 8/1989 | Chuang | 132/218 |
| 4,964,428 A | * | 10/1990 | Lamatrice | 132/216 |
| 4,996,851 A | * | 3/1991 | Schinzinger et al. | 63/26 |
| 5,020,338 A | * | 6/1991 | Payne et al. | 63/12 |
| 5,081,853 A | * | 1/1992 | Salyer | 63/12 |
| 5,107,868 A | * | 4/1992 | Aryee | 132/201 |
| 5,233,845 A | * | 8/1993 | D'Andrade | 63/14.9 |

(Continued)

*Primary Examiner* — Patricia L Nordmeyer

(57) ABSTRACT

An attachable ornament for use with short haired, short furred, or hairless animals. In one embodiment, the ornament includes an ornamental portion, a strip of first material having a first side attached to said ornamental portion and a second side having a fur safe adhesive coating thereon. It also includes a strip of second material substantially covering and removably adhered to the adhesive coating, wherein said second strip of material is removable without substantially degrading the effective tackiness of the fur safe adhesive coating. In another embodiment, the ornament includes an ornamental portion having a receptacle having a lip for for slidably receiving an insertable adhesive tab. In either embodiment the ornamental portion may optionally include various functional means such as dispenser of therapeutic scent, powder or ointment, or a portion that changes color when a pet is exposed to too much ultraviolet light.

6 Claims, 5 Drawing Sheets

(56) References Cited

U.S. PATENT DOCUMENTS

| | | | | |
|---|---|---|---|---|
| 5,658,270 A * | 8/1997 | Lichstein | | 604/387 |
| 5,817,385 A * | 10/1998 | Stanislav | | 428/40.2 |
| 6,079,224 A * | 6/2000 | Schehr | | 63/12 |
| 6,135,122 A * | 10/2000 | Campbell et al. | | 132/201 |
| 6,857,935 B1 * | 2/2005 | Dohan | | 450/81 |
| 7,334,586 B2 * | 2/2008 | Pilmanis | | 132/320 |
| 8,550,094 B2 * | 10/2013 | Cocuzza | | 132/201 |
| 2001/0012546 A1 * | 8/2001 | Braun | | 428/34.1 |
| 2002/0020190 A1 * | 2/2002 | Clark et al. | | 63/14.9 |
| 2004/0033325 A1 * | 2/2004 | Shea et al. | | 428/40.1 |
| 2006/0204702 A1 * | 9/2006 | Thevenet | | 428/40.1 |
| 2008/0121557 A1 | 5/2008 | Jacobsen | | |

* cited by examiner

FIGURE 5
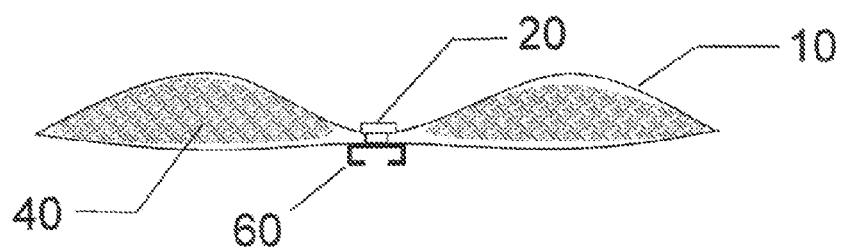
FIGURE 6A   FIGURE 6B   FIGURE 6C
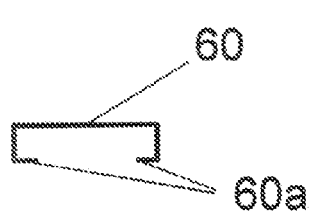 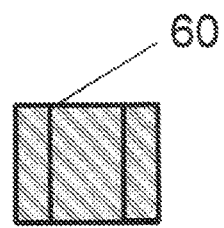 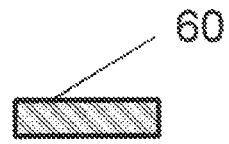

ATTACHABLE ORNAMENT WITH FUNCTIONAL FEATURES

CROSS REFERENCE TO RELATED APPLICATIONS

This application claims priority to U.S. Provisional Patent Application Ser. No. 61/438,714 filed on Feb. 2, 2011.

BACKGROUND OF THE INVENTION

1. Field of the Invention

This invention relates to ornaments for short haired animals as well as systems and methods for attaching the same to the hair, fur or skin.

2. Description of the Related Art

Owners of short haired pets commonly wish to place bows or other ornaments on their animals. While clip on ornaments are well known in the prior art, they tend to be impractical for use on animals with short hair. It is also known in the prior art to have ornaments and functional devices (e.g. devices that dispense pet care substances) attached to a pet by means of a collar. While these devices indeed can be used to secure an ornament to a pet, they are in a relatively fixed position (the neck) which may not be where the owner wants the ornament. There are also prior art solutions available that use "stick on" ornaments, but each of these has its own drawbacks.

U.S. Patent Application 2008/0121557 to Jacobsen (entitled "Reusable Pet and Infant Hairbow Kit and Method") discloses a hair bow kit for infants and children having thin hair or no hair on their scalp. The hair bow kit comprises a closable supply of a hair-safe and scalp-safe liquid adhesive and a plurality of infant hair bows/ornaments in a variety of sizes. The infant hair bows may have a substantially flat lower surface able to receive glue. The patent application also discloses a method of applying a smaller hair bow/ornament to an infant's scalp having thin hair by providing a hair-safe liquid adhesive in a closable container having a tip suitable for delivery of a single drop of glue to the scalp of the infant, The method includes the steps of providing an infant hair bow, placing one drop of the adhesive on the scalp or the bow, and pressing the bow to the infant's scalp.

While the forgoing solution provides a removable and reusable method of attachment, the use of a separate liquid adhesive may not be practical or convenient in certain situations and environments.

U.S. Pat. No. 4,024,879 to Stryker (entitled "Stick-a-brow") discloses an eyebrow beauty kit of hair bearing flexible adhesive backed material. The adhesive backing enables an artificial eyebrow to be detachably applied to the human face. Eyebrow color may be changed to match hair, wig or clothing.

While the foregoing patent provides a solution with a convenient adhesive backing, it does not deal with the problem of attaching an ornament to the hair or fur of short haired pets in a manner such that it can be easily and humanly removed without discomfort to the animal. It also does not provide the means for reapplying the same ornament to a pet after it is removed from the hair or fur.

A stick on jewelry product is also commercially available from NEWD™ by Alessandro Masini. NEWD's Skin Touch™ technology utilizes a special adhesive film that allows the user to apply jewelry directly to the skin. In order to apply the jewelry, the skin is first cleaned with soap or alcohol and dried. The adhesive film is peeled from the transparent strip. A protective film is then peeled from the adhesive and the jewel is placed onto the clean area of skin. Each time the jewel is removed or repositioned the adhesive film must be replaced.

While the foregoing solution provides an excellent method for attaching and reattaching jewelry to human skin, it does not appear to have been designed for attaching or reattaching an ornament to the fur or hair of a short haired pet.

BRIEF SUMMARY OF THE INVENTION

The present invention provides a novel attachable ornament for use with short haired, short furred, or hairless animals. In one embodiment, the ornament includes an ornamental portion, a strip of first material having a first side attached to said ornamental portion and a second side having a fur safe adhesive coating thereon. It also includes a strip of second material substantially covering and removably adhered to the adhesive coating, wherein said second strip of material is removable without substantially degrading the effective tackiness of the fur safe adhesive coating. In another embodiment, the ornament includes an ornamental portion having a receptacle having a lip for for slidably receiving an insertable adhesive tab. In either embodiment the ornamental portion may optionally include various functional means such as dispenser of therapeutic scent, powder or ointment, or a portion that changes color when a pet is exposed to too much ultraviolet light.

BRIEF DESCRIPTION OF THE SEVERAL VIEWS OF THE DRAWINGS

FIG. 5 shows an alternative embodiment of an ornament according to an embodiment of the present invention;

FIGS. 6A, 6B and 6C show, respectively, front, bottom and side views of a receptacle used in the ornament of FIG. 5.

DETAILED DESCRIPTION OF TELE INVENTION

Figure 1:
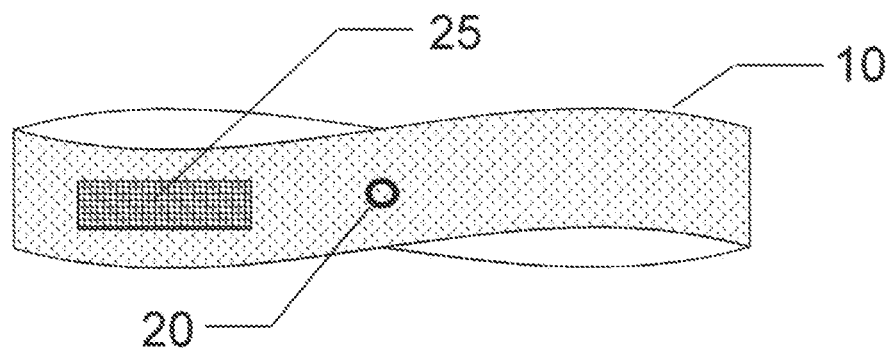
FIG. 1 shows an ornament and adhesive backing according to an embodiment of the present invention.

A top view of an ornament and adhesive backing according to an embodiment of the present invention is shown in FIG. 1. The ornament itself can be, for example, a bow 10 made of a polyester ribbon attached at the center by way of a metal grommet 20, thread, wire or a suitable adhesive.

Like humans, animals can also be sensitive to overexposure to ultra violate (UV) rays. Thus, in one embodiment, a portion 25 of the bow 10 is dyed or painted with an ultraviolet sensitive ink in an arrangement that changes color over time when exposed to direct sunlight or another source of UV. The inked portion can be protected with a layer of material until such time as the user wishes to begin measuring ultraviolet exposure. An example of such a suitable ink and its use is described in U.S. Pat. No. 6,734,440 to Questel et al., which is incorporated by reference herein as if printed in full below.

When the UV sensitive portion of the bow indicates that an animal has been exposed to an unsafe or otherwise unadvisable level of UV rays (e.g. UVA, UVB or both), the animal can be brought inside or otherwise removed from direct exposure to sunlight. The ultraviolet sensitive portion 25 can also be made of a separate strip of material which is irremovably attached to the bow by way of an adhesive.

Figure 2:
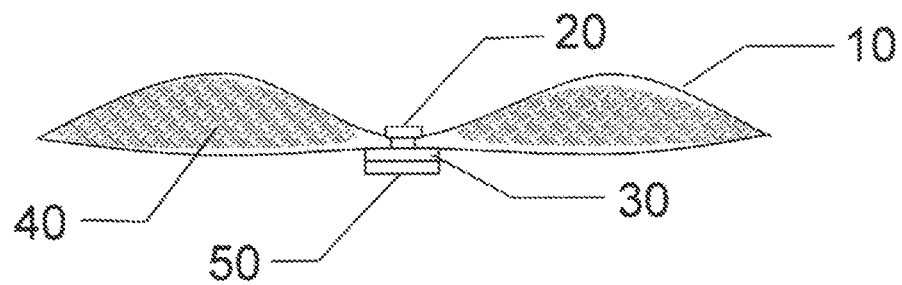
FIG. 2 is a side view of the ornament of FIG. 1.
Figure 3:
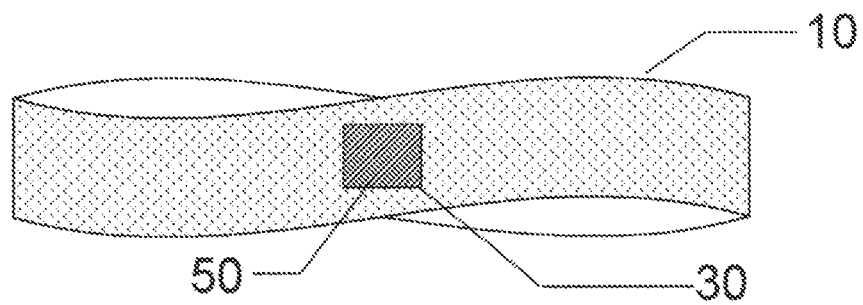
FIG. 3 is a bottom view of the ornament of FIG. 1.

As shown in FIG. 2, an adhesive portion 30 is attached to the bottom of the bow. The adhesive tape portion is made of a medical type tape that is safe for the fur of animals. An example of a suitable adhesive tape is Kendall Wet-Pruf 1" wide medical tape. As shown in FIGS. 2 and 3, the adhesive portion is cut into a rectangle of a single layer, or, alternatively can be made of multiple layers with a peelable material in between layers of two-sided tape. In the latter example, medical adhesive tape can be modified so that it has adhesive on both sides, although only the side facing away from the bow needs to be animal safe. The adhesive portion 30 tape can be attached to the bow by its own adhesive (e.g. the top layer of a tape with adhesive on both sides), a spot of conventional glue (e.g. attached by a hot glue gun), or by having the grommet attach the adhesive portion through the layer closest to the bow. In the multi-layer embodiment, the peelable material (e.g. a release liner) 50 can be placed in between layers and on the outside facing bottom-most layer. It is placed so that it covers the adhesive and can be peeled away to expose it for use in attaching the bow to the animal. In this embodiment each layer of tape can be peeled away from next layer of the peelable material after use, thus making a fresh layer of adhesive available. A suitable peelable material is Release Liner: 38#, Silicone one side "RF-7000-71", available from Rayven Inc. If it is preferred that each layer of tape be more easily removable from the peelable material such that when each successive layer of tape is removed the peelable material in between layers remains in place, then a release liner with silicon on two sides can be used instead.

As further shown in FIG. 2, the loops inside the bow contain an absorbent material 40 (such as a cotton ball) which can be impregnated with a powder, or moistened with a liquid or ointment. The powder or liquid can be, for example, a flea powder or a therapeutically scented powder or liquid such as lilac water or powder or another substance that tends to calm dogs. The cotton ball or other absorbent material 40 can also be attached to the bow by way of a drop of conventional material-appropriate glue applied so as to cause the material to adhere (over a small portion) with the inside of both the top and bottom layers of the bow.

A bottom view of the ornament is shown in FIG. 3. The multi-layer adhesive tape 30 is attached to the bow such that when the peelable backing 50 is removed, the bow can be adhesively attached to the fur or hair of the animal (e.g. on the head or neck).

Figure 4:
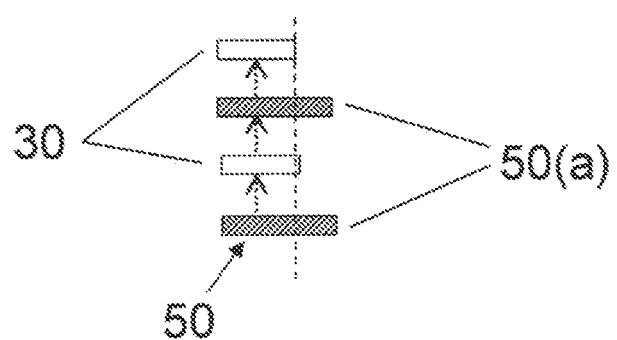
FIG. 4 shows how layers of adhesive and release liners are alternated in an embodiment of the present invention.

The peelable material 50 can be cut to the same size as the tape layers 30, or as shown in FIG. 4, the peelable material 50 can be cut in to slices slightly longer than the tape 30 so as to leave a small tab 50(a). In this embodiment, as the ornament is removed from the animal, the owner can hold the tab 50(a) against the bow, helping to ensure that the assembly stays intact while only the layer on the tape in contact with the animal remains in place (and can be separately removed).

An alternative embodiment to the ornament is shown in FIG. 5. Rather than having a layer of adhesive directly attached the ornament, the ornament includes a receptacle 60 designed to receive and firmly hold a removable adhesive strip. The strip can be slid into the receptacle 60, which is of a size to firmly (but irremovably) hold the strip in place by operation of friction. FIGS. 6A, 6B and 6C show, respectively, front, bottom and side views of the receptacle 60.

Figure 7A:
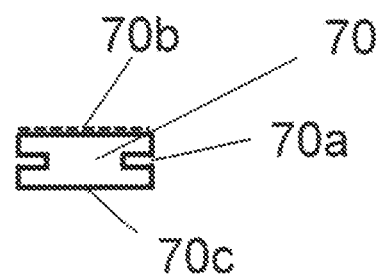
FIGS. 7A, 7B and 7C show, respectively, front, bottom and side views an embodiment of an adhesive insert that can be irremovably inserted into the receptacle of FIGS. 6A, 6B and 6C.
Figure 7B:
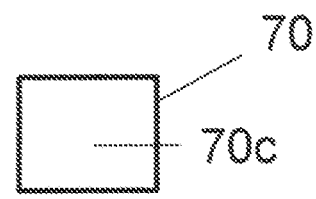
Figure 7C:
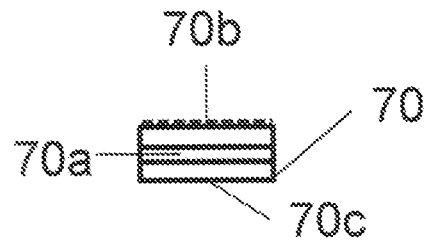

FIGS. 7A, 7B and 7C show, respectively, front, bottom and side views an embodiment of an adhesive insert 70 that can be irremovably inserted into the receptacle 60. The insert includes a slots or groves 70a on two sides into which the lip 60a of the receptacle 60 can be inserted. Each insert includes a rough, non-adhesive side 70b which, when inserted in the respectable, makes contact with the base of the receptacle 60 and an adhesive side 70c which similar the adhesive portion is designed to make contact with the fur or skin of the animal. Like the adhesive portion 30, the adhesive side 70c can be covered with a removable release liner.

Figure 8:
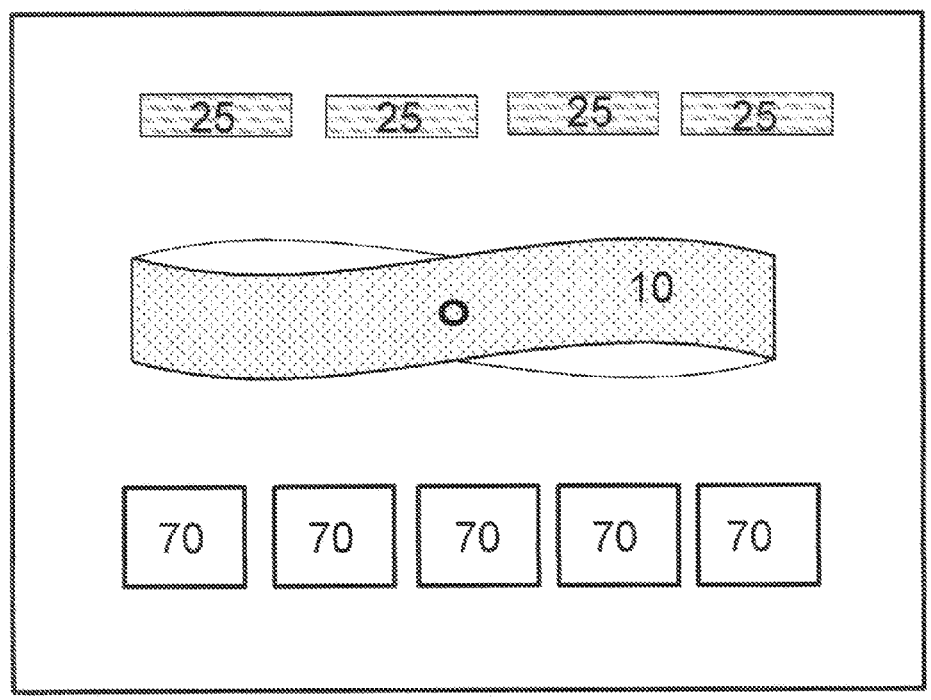
FIG. 8 shows a blister pack including the ornament of FIG. 5, replacement adhesive inserts, and replacement strips of adhesively backed ultraviolet sensitive material.

FIG. 8 shows a blister pack including the ornament 10, adhesive inserts 70 and strips of adhesively backed ultraviolet sensitive material.

In an alternative embodiment of the present invention, the adhesive tape can be replaced with a transdermal patch of a type that delivers medication. For example, prior art publications describe how the pain killer Fentanyl may be administered to animals through such a patch. In this way, the ornament can be used to cover a patch of exposed skin through which the medication is delivered.

The invention claimed is:

1. An attachable ornament, comprising:
    a) an ornamental portion; and,
    b) a receptacle attached to said ornamental portion, said receptacle having an open bottom portion, an open side portion, and means for slidably interlocking with an insertable adhesive tab;
    wherein the means for slidably interlocking with said receptacle includes a lip disposed to slide into a groove in said adhesive tab and wherein said open side portion is disposed to slidably receive said adhesive tab.

2. The attachable ornament of claim 1 where the ornamental portion includes an ultraviolet sensitive color changing portion.

3. The attachable ornament of claim 1 wherein the ornamental portion includes a chemically luminescent portion.

4. The attachable ornament of claim 1 wherein the ornamental portion includes a portion laced with a scented substance.

5. An attachable ornament, comprising:
    a) an ornamental portion; and,
    b) a receptacle attached to said ornamental portion
    wherein, (i) said receptacle has an open bottom portion and at least one open sided portion, (ii) said open sided portion is shaped to as to receive an insertable adhesive tab and (iii) said open bottom portion includes a lip on each of two opposing sides, said lip being disposed so as to mechanically interlock with said insertable adhesive tab when said tab is inserted into said open sided portion.

6. The attachable ornament of claim 5 wherein said adhesive tab is mounted in said receptacle and wherein said adhesive tab has generally an "H" shaped cross-sectional shaped and includes a slot formed therein such that said adhesive tab overlaps both a top portion and a bottom portion of said lip.

* * * * *